United States Patent [19]

Iwaisako et al.

[11] 4,414,111
[45] Nov. 8, 1983

[54] SHAPED COMPOSITE ADSORBENT AND A PROCESS FOR PREPARING THE SAME

[75] Inventors: Toshiyuki Iwaisako; Akio Inoue, both of Fuji, Japan

[73] Assignee: Asahi Kasei Kogyo Kabushiki Kaisha, Osaka, Japan

[21] Appl. No.: 385,410

[22] PCT Filed: Dec. 15, 1981

[86] PCT No.: PCT/JP81/00379
§ 371 Date: May 17, 1982
§ 102(e) Date: May 17, 1982

[87] PCT Pub. No.: WO82/02006
PCT Pub. Date: Jun. 24, 1982

[30] Foreign Application Priority Data

Dec. 15, 1980 [JP] Japan ................. 55-175769

[51] Int. Cl.³ ................. B05D 3/10; B05D 5/00
[52] U.S. Cl. ................. 210/500.2; 210/638; 428/141; 428/317.9; 428/336; 428/338; 521/27; 521/32
[58] Field of Search ................. 521/27, 28, 29, 32; 210/500.2, 638; 428/141, 317.9, 336, 338

[56] References Cited

U.S. PATENT DOCUMENTS 4,265,959  5/1981  Sano et al. ................. 521/27
4,360,434 11/1982  Kawaguchi et al. ............ 210/500.2

Primary Examiner—William J. Van Balen
Attorney, Agent, or Firm—Sprung, Horn, Kramer & Woods

[57] ABSTRACT

A shaped composite adsorbent made of a shaped porous material of a skin-core structure comprising a powdery ion-exchange type adsorbent and an ionic group-containing acrylonitrile polymer and wherein said shaped porous material has a semi-permeable skin layer of 0.01 to 1$\mu$ in thickness and a void volume rate of 50 to 90%, which is capable of adsorbing solutes present at low concentration with high selectivity and high yield. The shaped composite adsorbent of the present invention can be obtained by a process comprising dissolving an ionic group-containing acrylonitrile polymer in and dispersing a powdery ion exchange type adsorbent in an inorganic solvent for said acrylonitrile polymer, extruding the resultant into a coagulating liquid bath to effect coagulation-shaping thereof. The adsorption capacity and mechanical strength of the shaped composite adsorbent of the present invention can be further improved by subjecting the above-obtained coagulation-shaped material to heat treatment in a wet state, without drying.

11 Claims, 4 Drawing Figures

SHAPED COMPOSITE ADSORBENT AND A PROCESS FOR PREPARING THE SAME

FIELD OF THE INVENTION

This invention relates to a shaped composite adsorbent for removal or recovery of relatively low molecular weight substances from a large quantity of solution which contains impurities of relatively large-sized molecules such as colloids and the like, or for selective removal or recovery of specific solutes from a large quantity of low concentration solution, and also relates to a process for preparing the same. More particularly, the present invention is concerned with a shaped composite adsorbent made of a shaped porous material of a skin-core structure comprising a powdery ion-exchange type adsorbent and an ionic group-containing acrylonitrile polymer, and also concerned with a process for preparing the same.

DESCRIPTION OF THE PRIOR ARTS

To remove harmful substances or recover useful substances from a large quantity of solution, there may be employed sedimentation, floatation, filtration, coagulation, adsorption, dialyzation and other methods. Among them, adsorption is generally utilized as a method for removing or recovering relatively low molecular weight substances such as heavy metal ions, ammonia, pigments, surface active agents or the like from a low concentration solution in high yield. The adsorbents to be used for adsorption include an activated charcoal, an ion exchange resin, a zeolite, an activated alumina, a silicate and the like. Adsorptivity of each of these adsorbents is dependent heavily on the physicochemical affinity between the surface of the adsorbent and the solute, and on the effective surface area of the adsorbent. Accordingly, with a view to developing an adsorbent of improved adsorptivity, there has been made an attempt to enlarge the effective surface area of an adsorbent in addition to a physicochemical treatment of the surface of an adsorbent. To enlarge the effective surface area of an adsorbent, there is generally employed a measure of minimizing the grain size of the adsorbent or increasing the porosity thereof. An attempt for minimizing the grain size of an adsorbent is restricted, because a problem may arise in handling during the step of the adsorption operation. Moreover, a solution to be subjected to adsorption operation may contain a large quantity of colloidal substances having a property to be readily adsorbed onto the surface of the finely-granulated or microporous adsorbent. Such colloidal substances present in a solution tend to be adsorbed onto the surface of the adsorbent, thereby causing the adsorption capacity of the adsorbent to be lowered.

In order to cope with these problems, there was proposed in Japanese Patent Application Laid-Open Specification No. 50-70288 a method wherein the surface of the adsorbent in the form of granules is coated with a hydrophilic group-containing polymeric material. Further, in Japanese Patent Application Laid-Open Specification Nos. 50-80985 and 52-63189, there were proposed methods in which a solution having an organic polymer, inclusive or acrylonitrile polymer, dissolved therein and having a powdery adsorbent dispersed therein is extruded into a coagulating liquid to effect coagulation-shaping thereof. The characteristic feature common to these methods is that the surface of the adsorbent is coated with a semi-permeable coating layer of a polymeric material which is capable of passing therethrough low molecular substances. It is expected that these methods are effective for providing an adsorbent which is capable of preventing lowering of adsorption capacity caused by direct adherence of colloidal substances to the surface of the adsorbent, and are effective for simplification and expedition of the handling of the finely granulated absorbent. However, due to the presence of the semi-permeable coating layer on the surface thereof, the shaped adsorbent obtained by these methods is inevitably accompanied by lowering of the rate of adsorption which the adsorbent inherently has.

DISCLOSURE OF THE PRESENT INVENTION

With a view to giving a solution to this problem, the present inventors made intensive researches on the problem of the surface coating layer. As a result, it has been found that if in providing a powdery ion-exchange type adsorbent it is formulated into a porous shaped material of a skin-core structure using as a polymer substance an ionic group-containing acrylonitrile polymer and the thickness of the skin layer and the void volume rate of the porous shaped material are adjusted, not only is suppressed the resulting adsorbent with respect to lowering of the rate of adsorption caused by the surface coating layer formed on the polymer substance but also it is capable of selectively adsorbing, in high yield, even solutes which are present at low concentration.

The shaped composite adsorbent of the present invention is especially effective for the selective recovery of uranium from sea water in which uranium is contained at a concentration as extremely low as 3 ppb or so.

The above-mentioned shaped composite adsorbent of the present invention has characteristics as follows, that is, a shaped composite adsorbent made of a shaped porous material of a skin-core structure comprising a powdery ion-exchange type adsorbent and an acrylonitrile polymer containing 0.1 to 20% by weight of an ionic group and wherein said shaped porous material has a semi-permeable skin layer of 0.01 to 1$\mu$ in thickness and a void volume rate of 50 to 90%.

Examples of the powdery ion-exchange type adsorbent as referred to in the present invention are as follows. As examples of inorganic adsorbent materials, there can be mentioned natural and synthetic zeolites, clay minerals (montmorillonite, halloysite, allophane, kaolinate, etc), greensand, acid clay, titanic acid, zirconium phosphate, zirconic acid, zirconium tungstate, ammonium phosphomolybdate, phosphoantimonic acid, tungstic acid, dolomite, silicates (calcium salts, etc.) and the like. As examples of orgnic adsorbent materials, there can be mentioned ion exchange resins, chelate resins, nitrohumic acid, spherical sulfonated coal, peat, synthetic polyamino type collectors, ionic group-imparting activated charcoal and the like. The ion-exchange type adsorbent as used herein means an adsorbent which selectively adsorbs cation or anion as well as an amphoteric adsorbent which adsorbs both of them. In practicing the present invention, it is preferred to use a powdery ion-exchange type adsorbent, such as a natural or synthetic zeolite, zirconium phosphate, zirconium tungstate, ammonium phosphomolybdate, phosphoantimonic acid, zirconic acid, titanic acid, tungstic acid, a chelate resin (e.g. a chelate resin of imino carboxylic acid type, polyamine or polyimine type, Schiff base type, hydroxamic acid type, oxime type, azo type, oxy type or pyridine carboxylic acid type) or the like, which is capable of selectively adsorbing a predetermined substance, in combination with an ionic-group containing acrylonitrile polymer to obtain a shaped composite adsorbent which ensures far more excellent adsorption selectivity as well as excellent adsorption yield.

The term "powdery" as used herein indicates the granular state of grains of sufficiently small size as compared with the size of the shaped composite adsorbent. The grain diameter of the powdery substance should generally be $100\mu$ or less, preferably $10\mu$ or less. If the grain diameter of the powdery adsorbent exceeds $100\mu$, the adsorbent will have an extremely small effective surface area, whereby marked lowering of its absorptivity is caused. In addition, in this case, a skin layer having a thickness as small as $1\mu$ or less can hardly be obtained. According to the present invention, a powdery ion-exchange type adsorbent with a grain diameter of 0.1 to $100\mu$, preferably of 0.1 to $50\mu$ is advantageously employed.

The term "acrylonitrile polymer" as used herein means an acrylonitrile homopolymer or an acrylonitrile copolymer containing 60% by weight or more of acrylonitrile monomer units. Specific examples of the monomers to be used in prepare the copolymer of this kind are acrylic esters, methacrylic esters, vinyl halides, vinylidene halides, vinyl amides, vinyl esters, vinyl aromatic compounds, vinyl carboxylic acids such as acrylic acid or methacrylic acid, unsaturated dicarboxylic acids, allylsulfonic acid, methallylsulfonic acid and the like. Two or more of these monomers may be copolymerized to form a copolymer. As the ionic group to be introduced into the acrylonitrile polymer, there can be mentioned, for example, a carboxylic acid group, a sulfonic acid group, a sulfuric ester group, a phosphonic acid group, a phosphoric ester group, an ammonium group, a sulfonium group, a phosphonium group, a primary, secondary or tertiary amine base group, an amino group in amines, ethers and esters, a pyridinium group and the like.

The suitable ionic group to be introduced in the polymer should be elected considering the type and the polarity of the ion-exchange type adsorbent, but in general, from the viewpoint of adsorption efficiency, it is preferred to choose a relatively highly polar group such as a carboxylic acid group, sulfonic acid group, phosphonic acid group, ammonium group or the like.

As the method of introducing the ionic group into the acrylonitrile polymer, there may be employed such methods as graft polymerization or copolymerization of monomers containing ionic groups, polymer reaction [e.g. modifying (hydrolyzing) nitrile groups of an acrylonitrile polymer], and polymerization utilizing a polymerization catalyst capable of incorporating ionic groups into the formed polymer. The content of ionic groups in the acrylonitrile polymer may be varied depending upon the ionic activity of the ionic group, as well as the kinds of the adsorbent and the solute to be adsorbed thereon, but required to be in the range of from 0.1 to 20% by weight, preferably 0.5 to 15% by weight. With such a content of ionic groups, there can be attained such an effect that the resulting adsorbent can adsorb solutes which are dissolved at low concentration, with high selectivity in high yield. When the ionic group content is lower than 0.1% by weight, good results can hardly be obtained, since the affinity between the adsorbent and solutes becomes poor. On the other hand, when the ionic group content exceeds 20% by weight, the selective adsorption capacity of the adsorbent will unfavorably be impaired.

In the shaped composite adsorbent of the present invention, the weight ratio of the acrylonitrile polymer to the powdery ion-exchange type adsorbent is 1:0.5 to 1:10.

The term "skin-core structure" as referred to in the present invention is intended to mean a non-uniform structure consisting of a relatively dense surface layer and a relatively coarse internal portion which can be observed by means of an optical or electron microscope. The skin layer is a thin, semi-permeable coating layer composed mainly of a polymer and usually having a pore diameter of $0.1\mu$ or less. The core is composed of a dispersion of the adsorbent (powder) and the polymer (binder), which is spongy or in a form like a honeycomb with holes. The skin-core strucutre can be obtained by subjecting a polymer solution to coagulation-shaping according to the wet or dry process, followed by removal of the solvent from the resulting coagulated material. The skin-core structure can be easily obtained by the use of the wet process.

The skin layers obtained by the known processes such as those disclosed in Japanese Patent Application Laid-Open Specification Nos. 50-80985 and 52-63189 usually have a thickness of from several to several tens of microns. But the thickness of the skin layer often becomes $100\mu$ or more when the adsorbent material is formed according to a wet process in which an organic solvent is used, or a wet process in which coagulation is effected under mild coagulation conditions, or a dry process.

Because the skin layer is dense, it exhibits a marked resistance against the diffusion of solutes into the inside of the shaped material. Accordingly, in order to increase the adsorption capacity of the shaped material, it is required to render the skin layer as coarse and thin as possible. In order to ensure the excellent adsorption capacity, the thickness of the skin layer should be $1\mu$ or less. As a result of the intensive studies, the present inventors have succeeded in obtaining a thin skin layer of $1\mu$ or less, usually 0.01 to $1\mu$ in thickness according to the wet process. They have also succeeded in rendering the surface of the skin layer coarse like the surface of a pumice, by subjecting the coagulation-shaped product obtained by the above-mentioned wet process to desolvation and then heat treatment in the wet state.

The term "a shaped porous material" as used herein means a material having within its entire inner structure a number of micropores which, when the material is immersed in water, are capable of penetrating the water into the entire structure. The shape of the shaped porous material may be any of those of granule, yarn, strip, hollow fiber, flat film, tube, mass and the like. The size thereof is desirable to be about several tens times the particle diameter of the powdery adsorbent, or to be several mm or less in diameter or thickness.

The "void volume rate" as referred to in the present invention is defined as the percentage of the change in volume of the shaped composite adsorbent, namely the apparent volume ($V_I$) in the dry state minus the compressed volume ($V_0$) under compression, against the apparent volume ($V_I$) in the dry state. That is, the void volume rate is expressed as $(V_I - V_0) \times 100/V_I\%$. The apparent volume ($V_I$) as referred to above is the volume of a shaped material of a predetermined weight, which volume is measured by means of a mercury pycnometer. On the other hand, the compressed volume ($V_0$) is the volume of a material with the same weight as mentioned above which has been subjected to compression-molding between press plates at 100° C. under a pressure of 50 g/cm². The void volume rate has a great influence upon the rate of adsorption as well as the equilibrated adsorption amount. It is preferred from the practical viewpoint that the void volume rate be 50 to 90%, more advantageously 60 to 80%. When the void volume rate is less than 50%, the effect of the adsorbent present within the shaped material will be markedly decreased. On the other hand, when the void volume rate exceeds 90%, the mechanical strength of the shaped material is unfavorably impaired.

In the meantime, the reasons for the fact that the shaped composite adsorbent of the present invention exhibits a high-yield and selective adsorption capacity even for solutes which are present at low concentration are believed to be as follows.

(1) The skin layer of the shaped composite adsorbent of the present invention exhibits increased affinity with ionic solutes or polar low-molecular-weight solutes, since it comprises an acrylonitrile polymer, especially that containing ionic groups, which is hydrophilic and excellent in microporous structure-forming capacity.

(2) The skin layer of the shaped composite adsorbent of the present invention is semi-permeable and has a thickness as small as $1\mu$ or less, so that it does not adversely affect the permeation of low-molecular-weight solutes therethrough. Nevertheless, it blocks the permeation of colloidal substance or high-molecular-weight substances, thereby preventing lowering of the adsorptive activity of the adsorbent.

(3) The polarity of the ion-exchange type adsorbent and the ionic activity of ionic groups contained in the polymer can be adequately controlled so that mutual exchange of the adsorbed solutes occurs between the ion-exchange type adsorbent and the polymer, thereby enabling the adsorption equilibrium or the selectivity to be shifted.

The shaped composite adsorbent according to the present invention can be obtained by dissolving an ionic group-containing acrylonitrile polymer in and dispersing a powdery ion-exchange type adsorbent in a solvent for said acrylonitrile polymer, extruding the resultant into a coagulating liquid bath to effect coagulation-shaping thereof. As the solvent, an organic solvent can be employed, but it tends to unfavorablly cause formation of a thick skin layer. Hence, it is preferred to employ an inorganic solvent such as nitric acid, aqueous solution of rhodanate or zinc chloride or the like. Among them, nitric acid is preferred especially for obtaining a thin skin layer. As the coagulating liquid, there is used an aqueous solution of the same solvent as used for dissolving therein an ionic group-containing acrylonitrile polymer and dispersing therein a powdery ion-exchange type adsorbent. Desirable skin layer thickness and void volume rate of the shaped composite adsorbent can be attained by adequately controlling the concentration and temperature of the coagulating liquid. The ranges of temperature and concentration of the coagulating liquid may be varied depending upon the conditions for dissolution and dispersion inclusive of the kind of the solvent, the composition ratio of the polymer and the adsorbent, the composition ratio of the polymer and the solvent or the like. Generally, greater concentration is more preferably, whilst any definite trend cannot be recognized with respect to temperature.

A process for preparing the shaped composite adsorbent of the present invention, in which nitric acid is employed as the solvent, will be illustrated hereinbelow.

The process consists in dissolving an ionic group-containing acrylonitrile polymer in and dispersing a powdery ion-exchange type adsorbent of 0.1 to $1\mu$ in particle diameter in nitric acid, extruding the resultant into a 30 to 45 weight % nitric acid bath having a temperature of 5° to 50° C. to effect coagulation-shaping thereof. The weight ratio of the acrylonitrile polymer to the powdery ion-exchange type adsorbent is preferably 1/0.5 to 1/10, and the weight ratio of the acrylonitrile polymer to the nitric acid as the solvent is preferably 1/20 to 1/5. When the temperature of the nitric acid serving as the coagulating liquid is lower than 5° C., or when the nitric acid concentration exceeds 45%, the rate of coagulation becomes too low. On the other hand, when the temperature is greater than 50° C., or when the concentration is below 30%, the rate of coagulation becomes too high. In either of the above cases, a thick skin layer of $1\mu$ or more in thickness is formed on the overall surface of the coagulation-shaped material. The obtained coagulation-shaped material is then washed with water to remove the solvent therefrom. The resulting shaped material can be put to a practical use in a wet state as it is. Alternatively, it can be used after drying at a temperature of 70° C. or less.

In the meantime, the adsorption capacity and the mechanical strength of the shaped composite adsorbent according to the present invention can be further improved by subjecting the adsorbent to heat treatment while keeping it in a wet state. FIG. 1 and FIG. 2 respectively show the surface structure ($\times 1,400$ magnification) and the cross section of the structure of the internal portion ($\times 1,400$ magnification) of the shaped composite adsorbent comprising an acrylonitrile polymer containing a sulfonic acid group as the ionic group and titanic acid powder and prepared according to the process of the present invention which comprises dissolving a polymer in and dispersing an adsorbent in nitric acid as the solvent, extruding the resultant into a coagulating liquid to effect coagulation-shaping thereof, followed by removal of said solvent from the resulting shaped material. The surface of the shaped composite adsorbent of the present invention covered by a thin skin layer of the polymer and the porous core consisting of titanic acid particles bonded by the polymer can be observed in these figures. On the other hand, FIG. 3 and FIG. 4 respectively show the surface structure and the cross section of the structure of the internal portion of the above-mentioned shaped composite adsorvent according to the present invention which was, after removal of the solvent therefrom, further immersed in hot water of 80° C. for heat treatment. The surface structure and cross sectional structure were observed by means of a microscope of a magnification as will be mentioned later. As compared with FIG. 1 and FIG. 2, the adsorbent shown in FIG. 3 and FIG. 4 has an uneven surface with a plurality of small, crater-like holes, and has an increased effective surface area. Furthermore, as is apparent from FIGS. 3 and 4, especially from FIG. 3, the surface of the skin layer of the composite adsorbent subjected to heat treatment exhibits a so-called pumice-like appearance. The reasons for such a structural change induced by the heat treatment in hot water have not yet been elucidated. However, it is presumed that the structural change is due to cutting of the polymer coating which is caused by the difference in heat-shrinkage between the adsorbent particle having a relatively low heat-shrinkability and the acrylonitrile polymer having a relatively high heat-shrinkability, and/or due to formation of voids which is caused by possible dissolution-out of the hot water-soluble ingredients of the polymer and the adsorbent in the course of heat treatment. The same structural change as caused by the hot water-treatment can be brought about by a hot saturated vapor also. Heat treatment with a hot saturated vapor also leads to an improvement of the adsorption capacity and mechanical strength of the adsorbent. However, from the viewpoint of improving the adsorption capacity and mechanical strength of the adsorbent, it is most desirable to conduct hot water-treatment. Especially, the hot water-treatment in which the adsorbent is immersed in hot water at a temperature of 70° C. or more for several to several tens of minutes is most preferred. In either of the wet heat treatments, in order to ensure the improved adsorption capacity and mechanical strength, it is preferable to subject the coagulation-shaped composite adsorbent, after removal of the solvent therefrom, to heat treatment in the wet state, without drying, and after completion of the heat treatment, leave the adsorbent in the wet state as it is. Alternatively, it is still preferable to subject the adsorbent to drying at a temperature of 70° C. or less after the above-mentioned heat treatment in the wet state.

The shaped composite adsorbent according to the present invention can be utilized in a wide variety of fields, including, for example, the removal and recovery of ammonia, surface active agents, pigments, heavy metals or the like from industrial or city service water, the recovery and purification of various kinds of amino acids or saccharides in the food industry, the purification of drug liquids in the pharmaceutical industry, the recovery of uranium from sea water or mineral water, the removal of low-molecular-weight harmful substances from blood or body fluid in the field of medical treatment, and the like. Especially, the shaped composite adsorbent of the present invention can be effectively utilized for the selective adsorption-recovery of substances from solutions in which the substances are present at extremely low concentration, for example, for the recovery of uranium from sea water.

PREFERRED EMBODIMENTS OF THE INVENTION

Figure 1:
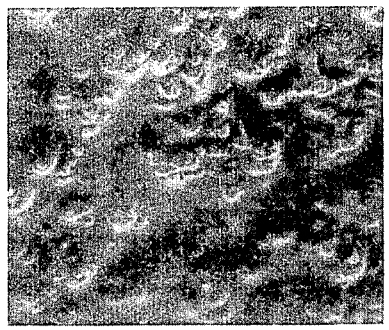
FIG. 1 is a scanning electron photomicrograph (×1,400 magnification) of the surface of a shaped composite adsorbent according to the present invention obtained by dissolving an acrylonitrile polymer (acrylonitrile/acrylic methyl: 92/8 in weight ratio) containing 0.27% by weight of sulfonic acid groups as an ionic group in and dispersing titanic acid powder of 2 to 3μ in particle diameter (acrylonitrile polymer/titanic acid powder: 1/5 in weight ratio) in nitric acid used as a solvent (actually, an acrylonitrile polymer is dissolved in aqueous 60% by weight nitric acid of a concentration of 7%, and a titanic acid is added thereinto under agitation), extruding the resultant into an aqueous 33% by weight nitric acid solution having a temperature of 15° C. to effect coagulation-shaping thereof, and removing the solvent from the resulting shaped material, followed by drying at a temperature of 70° C. or less.
Figure 3:
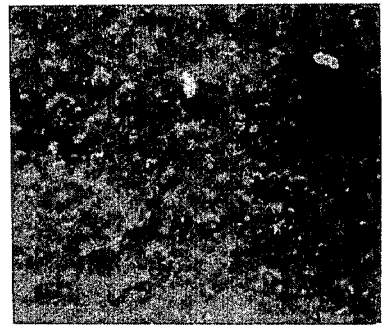
FIG. 3 is a scanning electron photomicrograph (×490 magnification) of the surface of the shaped composite adsorbent obtained by practicing substantially the same process as explained referring to FIG. 1 except that, after the removal of the solvent from the coagulation-shaped material, the material is immersed in hot water of 80° C. to effect heat treatment thereof in the wet state and then dried at a temperature of 70° C. or less.
Figure 2:
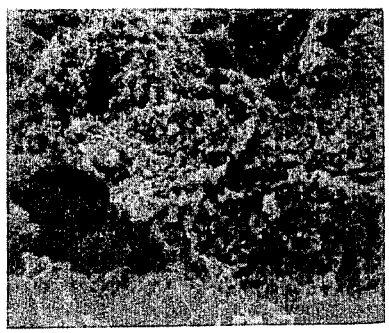
FIG. 2 is a scanning electron photomicrograph (×1400 magnification) showing the cross section of the core structure of the shaped composite adsorbent as shown in FIG. 1.
Figure 4:
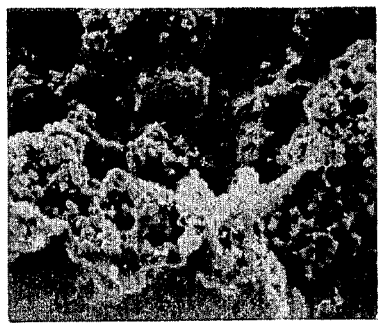
FIG. 4 is a scanning electron photomicrograph (×1400 magnification) showing the cross section of the core structure of the shaped composite adsorbent as shown in FIG. 3.

The present invention will now be illustrated in more detail with reference to the following Examples. The expression "parts" as used in the following Examples means "parts by weight", unless otherwise specified.

Example 1

100 parts by weight of sodium zeolite which has been classified to have a particle diameter of 0.02 mm or less were dispersed in and 30 parts of a respective copolymer of acrylonitrile/methyl acrylate/methallylsulfonic acid [weight composition ratio: 94.0/7-α/α (α stands for the amount of methallylsulfonic acid)] of which the sulfonic acid group contents were 0, 0.1 and 0.8 weight %, respectively were dissolved in 300 parts of 70% nitric acid at 0° C. Each of the resultants was then extruded by means of a multinozzle having an orifice diameter of 0.24 mm into a 35 weight % nitric acid bath having a temperature of 20° C. to effect coagulation-shaping thereof while drawing the coagulation-shaped materials. The resulting yarn-like shaped materials having a diameter of about 0.6 mm were washed with water to completely remove the nitric acid therefrom, and used for the subsequent trivalent chromium ion-adsorption test. The trivalent chromium ion-adsorption test was conducted as follows. 10 g of the above-obtained yarn-like shaped adsorbent (approximately 3 g in a dry state) was cut into pieces each of about 1 cm in length, and then they were packed in a column of 24 mm in diameter. 1 liter of each of aqueous chromium trichloride solutions having a pH value of 4 and containing 3, 10 and 50 ppm of trivalent chromium ion, respectively was separately passed through the column from its top. The adsorption of chromium ion by permeation is shown in Table 1.

Meanwhile, the above-obtained yarn-like adsorbent had a void volume rate of 67 to 70% and was of a skin-core structure with its skin layer having an extremely small thickness (about 0.1μ).

TABLE 1

| | Adsorption (%)* of chromium ion | | | |
|---|---|---|---|---|
| | Sulfonic acid group content of | Chromium ion concentration in original solution, ppm | | |
| Sample No. | polymer, % | 3 | 10 | 50 |
| 1 | 0.8 | 100 | 95 | 35 |
| 2 | 0.1 | 95 | 90 | 30 |

TABLE 1-continued

| | Adsorption (%)* of chromium ion | | | |
|---|---|---|---|---|
| | Sulfonic acid group content of | Chromium ion concentration in original solution, ppm | | |
| Sample No. | polymer, % | 3 | 10 | 50 |
| 3 | 0 | 70 | 50 | 20 |

(No. 3 is for comparison purpose)
*Adsorbed amount of chromium ion relative to the amount (100) of chromium ion in original solution Comparative Example 1

100 parts by weight of sodium zeolite as used in Example 1 were dispersed in and 30 parts of an acrylonitrile terpolymer having a sulfonic acid group content of 0.8 weight % were dissolved in 300 parts of dimethylformamide (DMF), and the resultant was then extruded into a 20 weight % DMF bath of room temperature to obtain a yarn-like material. After washed with water to completely remove the solvent therefrom, the resulting yarn-like material was used as a test sample for the same chromium ion-adsorption test as in Example 1. As a result, the relationships (the chromium ion concentration in origianl solution/the adsorption of chromium ion) were found to be 3 ppm/40%, 10 ppm/25% and 50 ppm/10%. Meanwhile, the above-obtained yarn-like material had a void volume rate of 55%, but the skin layer had a thickness of about 10 μ.

Example 2

25 parts of titanic acid of 300μ in average grain diameter and 10 parts of an acrylonitrile copolymer (weight composition ratio: acrylonitrile/methyl acrylate=92/8) (having a sulfonic acid group content of 0.27 weight %) were mixed in a powdery state. To the resulting mixture, 150 parts of 70 weight % nitric acid were added and agitated to obtain a homogeneous dope. The thus obtained dope was then extruded by means of a multinozzle having an orifice diameter of 0.2 mm into each of coagulatng baths of an aqueous solution of nitric acid under varied conditions indicated in Table 2 to obtain coagulated fibrous materials. After washed with water to completely remove the nitric acid therefrom, each of the above-obtained coagulated fibrous materials was then used, in a wet state, as a test sample for the uranium-adsorption test. The uranium-adsorption test was conducted as follows. The test samples were immersed in each of a large quantity of sea water and an aqueous solution of ammonium uranyl sulfate which contains uranyl sulfate complex ion (uranium concentration: 3 ppm, pH: 2.8) for 7 days to effect adsorption of the uranium values, followed by desorption and recovery of the uranium values by means of a 0.5 N aqueous hydrochloric acid solution.

Meanwhile, each of the above-mentioned coagulated materials were air-dried and then the surface thereof was observed by means of a scanning electron microscope (×2,400 magnification) for determination of a thickness of the surface skin layer of polymer. On the other hand, the void volume rate of each of the coagulated materials was measured separately. Results are shown in Table 2. Samples Nos. 4 to 8 are for comparison purpose.

TABLE 2

| | Structure of adsorbent and adsorbed amount of uranium | | | | | |
|---|---|---|---|---|---|---|
| | Coagulation bath conditions | | Adsorbed amount of uranium | | Void volume rate of coagulated material, % | Thickness of skin layer, μ |
| Sample No. | concentration, % | Temperature, °C. | sea water, μg/g.ad* | aqueous solution of uranium, mg/g.ad* | | |
| 1 | 42 | 15 | 241 | 22 | 76 | 0.5 > |
| 2 | 33 | 15 | 238 | 20 | 68 | 0.5 > |
| 3 | 33 | 5 | 224 | 21 | 66 | 1 |
| 4 | 33 | 0 | 140 | 18 | 47 | 10 |
| 5 | 27 | 0 | 102 | 14 | 45 | 22 |
| 6 | 27 | 15 | 105 | 18 | 50 | 12 |
| 7 | 0 | 15 | 92 | 13 | 47 | 16 |
| 8 | 0 | 15 | 86 | 11 | 42 | 45 |

*ad: shaped adsorbent (the same abbreviation will be used hereinafter)

Comparative Example 2

The same procedures were employed in Example 2 were repeated except that 150 parts of dimethylformamide (DMF) were added instead of the nitric acid to obtain a homogeneous dope. In the same manner as in Example 1, the thus obtained dope was then extruded by means of a multinozzle having an orifice diameter of 0.2 mm into each of water of 25° C. and an aqueous 30 weight % DMF solution to obtain coagulated fibrous materials. Measurement of the adsorbed amount of uranium, the void volume rate, the thickness of the skin layer were done in accordance with the same method as employed in Example 2. Results are shown in Table 3.

TABLE 3

| | Structure of adsorbent and adsorbed amount of uranium | | | | |
|---|---|---|---|---|---|
| | Coagulation bath conditions, DMF bath | Adsorbed amount of uranium | | Void volume rate of the coagulated material, % | Thickness of the skin layer, μ |
| Sample No. | concentration % | sea water, μg/g.ad | an aqueous solution of uranium, mg/g.ad | | |
| 1 | 0 (water) | 82 | 14 | 62 | 80 |
| 2 | 30 | 90 | 17 | 54 | 25 |

From the comparison of the results shown in Table 3 with those obtained from sample Nos. 1 to 3 as used in Example 2, it is apparent that the difference adsorbed amount of uranium between samples Nos. 1 to 3 of Example 2 and samples Nos. 1 and 2 of Comparative Example 2 is larger in the case of adsorption from the sea water with a low uranium concentration than in the cause of that from the aqueous solution of uranium with a high uranium concentration.

Example 3

Measurement of the rate of adsorption of uranium was conducted with respect to each of wet coagulated materials as prepared as test samples Nos. 1, 2, and 7 in Example 2 and as test Sample No. 2 in Comparative Example 1. The same sea water and aqueous solution of uranium (uranium concentration: 3 ppm) as used in Example 1 were used for this measurement. Results are shown in Table 4.

TABLE 4

| Sample No. | Aqueous solution of uranium for adsorption test | Adsorbed amount of uranium Immersion time for adsorption test, day | | | | |
|---|---|---|---|---|---|---|
| | | 0.5 | 1 | 3 | 7 | 14 |
| Example 1 No. 1 | Sea water | 48 | 94 | 195 | 237 | 248 |
| | Aqueous solution of uranium | 13 | 16 | 21 | 23 | 25 |
| Example 1 No. 2 | Sea water | 38 | 75 | 178 | 235 | 244 |
| | Aqueous solution of uranium | 11 | 15 | 18 | 20 | 23 |
| Example 1 No. 7 (comparative) | Sea water | 13 | 22 | 58 | 94 | 127 |
| | Aqueous solution of uranium | 7 | 10 | 12 | 14 | 17 |
| Comparative | Sea water | 8 | 14 | 47 | 88 | 110 |
| Example 2 No. 2 | Aqueous solution of uranium | 8 | 11 | 13 | 16 | 19 |

(unit) Adsorbed amount of uranium
Sea water [μg/g.ad]
Aqueous solution of uranium [mg/g.ad]

Example 4

100 Parts of acid clay having a grain diameter of 0.05 mm or less were dispersed in and 40 parts of a copolymer of acrylonitrile/acrylic acid (weight composition ratio: 96/4) were dissolved in 300 parts of 70% nitric acid at 0° C. to obtain a homogeneous dope. According to the same method as employed in Example 1, the resulting homogenous dope was extruded into each of nitric acid baths under varied coagulating bath conditions as indicated in Table 5 to obtain yarn-like materials. The thus obtained yarn-like materials were washed with water to completely remove the nitric acid therefrom, and used, in a wet state, as test samples for the ammonia-adsorption test. Test was conducted in substantially the same manner as in Example 1 except that 1 liter of each of ammonia water containing 5 and 20 ppm of ammonia, respectively was separately passed through the column from its top to effect measurement of the adsorption of ammonia. The void volume rate, the thickness of the skin layer, the adsorption of ammonia of the resulting samples were shown in Table 5.

TABLE 5

| | Coagulating bath conditions and Adsorption of Ammonia [%] | | | | | |
|---|---|---|---|---|---|---|
| | Coagulation bath conditions | | Void volume rate, % | Thickness of the skin layer, μ | Adsorption of ammonia Ammonia concentration in original solution | |
| Sample No. | Concentration, % | Temperature, °C. | | | 5 ppm | 20 ppm |
| 1 | 38 | 30 | 72 | 1 > | 100 | 90 |
| 2 | 38 | 10 | 54 | 1 > | 100 | 85 |
| 3 | 20 | 0 | 58 | 20 | 55 | 20 |
| 4 | 20 | 30 | 42 | 1 > | 70 | 30 |
| 5 | 10 | 0 | 45 | 50 | 40 | 15 |

(Samples Nos. 3, 4 and 5 are for comparison purpose)

Example 5

Sample No. 2 as used in Example 2 was immersed in hot water having a varied temperature as indicated in Table 6. Using the resulting materials, substantially the same procedures as in Example 3 was repeated to measure the rate of adsorption of uranium, except that the measurement was done only with respect to the sea water.

TABLE 6

| Experiment No. | Temperature of hot water, °C. | Void volume rate of the adsorbent, % | Adsorbed amount of uranium [μg/g · ad] Immersion time for adsorption test, day | | | | |
|---|---|---|---|---|---|---|---|
| | | | 0.5 | 1 | 3 | 7 | 14 |
| 1 | 55 | 65 | 36 | 76 | 164 | 215 | 232 |
| 2 | 60 | 64 | 52 | 104 | 203 | 243 | 258 |
| 3 | 90 | 61 | 63 | 110 | 223 | 238 | 240 |

The observation using an optical microscope showed that the surface of the adsorbent used in Experiment No. 3 had concaves and convexes like the surface of a pumice. In addition, as compared with the adsorbent which was not subjected to heat treatment, each adsorbent was less brittle and, especially, the adsorbent of Experiment No. 3 was excellent in this point.

Example 6

Sample No. 2 as employed in Example 2 was immersed in hot water of 70° C. for 5 minutes, and then used as a test sample for the same adsorption test as in Example 2, except that the measurement was done only with respect to the sea water. The same cycle of operation of adsorption of uranium and desorption thereof by hydrochloric acid as effected in Example 2 was repeated ten times. The adsorbed amount of uranium at each of the 5th-stage and 10th-stage operations was shown in Table 7.

TABLE 7

| Experiment No. | Temperature of hot water, °C. | Adsorbed amount of uranium [μg/g.ad] Adsorbed amount of uranium | | |
|---|---|---|---|---|
| | | 1 | 5 | 10 |
| 1 | 60 | 243 | 236 | 233 |
| 2 | 90 | 238 | 230 | 234 |

TABLE 7-continued

| Experiment No. | Temperature of hot water, °C. | Adsorbed amount of uranium [μg/g.ad] | | |
|---|---|---|---|---|
| | | 1 | 5 | 10 |
| 3 | untreated | 235 | 209 | 188 |

The adsorbent used in Experiments Nos. 2 and 3 stably retained their shapes, but the adsorbent used in Experiment No. 3 was brittle and showed some disorders in shape.

PROBABILITY OF UTILIZATION IN INDUSTRY

As described above, not only is suppressed the shaped composite adsorbent according to the present invention with respect to lowering of the rate of adsorption caused by the surface coating layer formed on the polymer substance, but also the present shaped composite adsorbent is unexpectedly capable of selectively adsorbing in high yield, even solutes which are present at low concentration. Accordingly, the shaped composite adsorbent according to the present invention has a wide variety of uses, for example, removal or recovery of ammonia, surface active agents, pigments, heavy metals or the like from the industrial or city service water, recovery and purification of amino acids or various kinds or saccharides in the food industry, purification of a drug liquid in the pharamaceutical industry, recovery of uranium from sea water or mineral water, removal of low-molecular-weight harmful substances from blood or body fluid in the field of medical treatment, and the like. Especially, the shaped composite adsorbent of the present invention can be effectively utilized for the selective adsorption-recovery of substances from the solutions in which the substances are contained at an extremely low concentration, for example, for the recovery of uranium from sea water.

What is claimed is:

1. A shaped composite adsorbent made of a shaped porous material of a skin-core structure comprising a powdery ion-exchange type adsorbent and an acrylonitrile polymer containing 0.1 to 20% by weight of an ionic group and wherein said shaped porous material has a semi-permeable skin layer of 0.01 to 1μ in thickness and a void volume rate of 50 to 90%.

2. A shaped composite adsorbent according to claim 1, wherein said powdery ion-exchange type adsorbent is at least one member selected from the group consisting of a zeolite, titanic acid, zirconium phosphate, zirconic acid and a chelate resin.

3. A shaped composite adsorbent according to claim 1, wherein said ionic group is at least one member selected from the group consisting of a carboxylic acid group, a sulfonic acid group, a phosphonic acid group and an ammonium group.

4. A shaped composite adsorbent according to claim 1, wherein the surface of said skin layer exhibits a pumiceus appearance when observed by means of an optical microscope.

5. A shaped composite adsorbent according to claim 1, wherein the void volume rate is 60 to 80%.

6. A process of preparing a shaped composite adsorbent made of a shaped porous material of a skin-core structure comprising a powdery ion-exchange type adsorbent and an acrylonitrile polymer containing 0.1 to 20% by weight of an ionic group and wherein said shaped porous material has a semipermeable skin layer of 0.01 to 1μ in thickness and a void volume rate of 50 to 90%, which comprises dissolving an ionic group-containing acrylonitrile polymer in and dispersing a powdery ion-exchange type adsorbent in an inorganic solvent for said acrylonitrile polymer, said acrylonitrile polymer and said powdery ion-exchange type adsorbent being employed in a weight ratio of 1/0.5 to 1/10, extruding the resultant into an inorganic coagulating liquid bath to effect coagulation-shaping thereof, followed by removal of said solvent from the resulting shaped material.

7. A process according to claim 6, wherein said solvent is nitric acid and said coagulating liquid is an aqueous nitric acid solution.

8. A process according to claim 7, wherein said coagulating liquid is an aqueous 30 to 45 weight % nitric acid solution having a temperature of 5° to 30° C.

9. A process according to claim 6, wherein said resulting shaped material obtained by the removal of the solvent is subjected to heat treatment in a wet state, without drying.

10. A process according to claim 9, wherein said heat treatment in a wet state is effected by means of hot water.

11. A process according to claim 10, wherein the hot water has a temperature of 70° C. or more.

* * * * *